No. 835,791. PATENTED NOV. 13, 1906.
V. W. KELLY.
PRUNING SHEARS.
APPLICATION FILED MAR. 7, 1906.
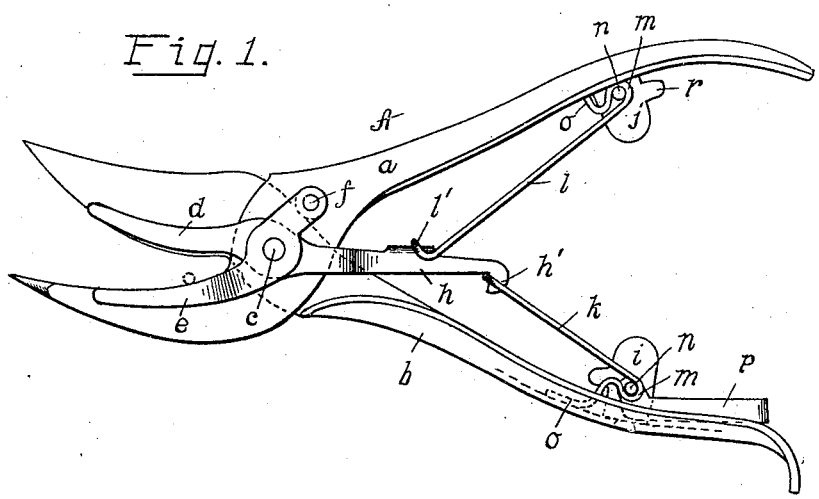
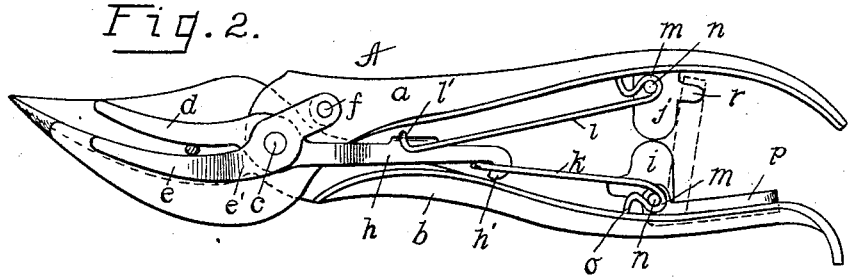
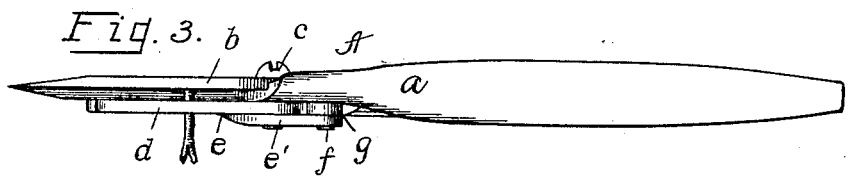
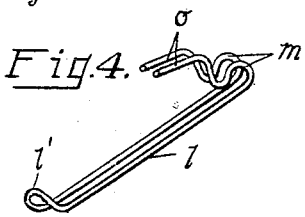
WITNESSES:
D. C. Walter
Lowell Schreiber
INVENTOR.
Vanrenselaer W. Kelly,
By Owen & Owen,
His attorneys.

UNITED STATES PATENT OFFICE.

VANRENSELAER W. KELLY, OF TOLEDO, OHIO.

PRUNING-SHEARS.

No. 835,791. Specification of Letters Patent. Patented Nov. 13, 1906.

Application filed March 7, 1906. Serial No. 304,792.

*To all whom it may concern:*

Be it known that I, VANRENSELAER W. KELLY, a citizen of the United States, and a resident of Toledo, in the county of Lucas and State of Ohio, have invented certain new and useful Improvements in Pruning-Shears; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to pruning or fruit shears, and has special reference to improvements in the construction of the shears described and claimed in the Letters Patent granted to me March 16, 1897, No. 579,093. During the practical and continued application of the shears covered by my said former Letters Patent to the use for which they are intended it has been found necessary to improve upon several features of the construction thereof in order to render the tool commercially practical and prolong its life.

The object of my invention is the provision of a pair of shears of this class which is strong and durable in its construction and designed to overcome the objections and weak features incident to said old construction, as will be hereinafter more fully described and finally claimed.

The invention is illustrated in the accompanying drawings, in which—

Figure 1 is a side elevation of the shears in open position; Fig. 2, a similar view thereof in closed position with the supplemental jaws gripping a twig. Fig. 3 is a top view of Fig. 2, and Fig. 4 is a perspective view of the tension-spring which coacts with the upper side of the lever of the movable supplemental jaw.

Referring to the drawings, A represents an ordinary pair of pruning or fruit shears such as are employed for severing small twigs or cutting off the stems of flowers or fruit and which have their relatively movable parts $a$ and $b$ connected by the pivot or pin $c$.

Carried at the outer side of the part $a$ of the shears are the supplemental jaws $d$ and $e$, the former of which is mounted for pivotal movement on the pivot $c$, while the latter is fixed to the side of the adjacent shear-blade. This latter jaw has its gripping edge flush with the side of the shear-blade of the part $a$, with its gripping-surface in the plane of the cutting edge of such blade and in the plane of movement of the jaw $d$ and has its rear portion offset or stepped from the side of said blade, as shown at $e'$, and disposed to cross the outer side of the jaw $d$ at its pivotal point. This offset portion is provided with a threaded aperture for receiving the end of the fulcrum pin or pivot $c$ and has its rear end rigidly attached to the shear-blade by a pin $f$ and spacing-collar $g$, as shown. By this construction of the jaw $e$ I provide both a shoulder or surface on the contiguous shear-blade for receiving the thrust of the companion jaw $d$ and a broadened bearing-surface for the fulcrum-pin $c$, thus making a more rigid and durable tool.

The jaw $d$ is provided with a lever $h$, which extends rearwardly between the handles of the shear parts and is formed at its rear end with a downwardly-projecting lip or hook $h'$. Projecting from the inner sides of the handles of the shear parts are the lugs or ears $i\ j$, to which are attached the rear ends of the tension-springs $k\ l$. These springs have their forward ends coacting, respectively, with the lower and upper sides of the lever $h$ in a manner adapted to cause the pressure or tension of the former to overcome that of the latter spring, so that the jaw $d$ will remain fixed relative to the shear part $b$ during a closing movement of such part and until the jaw coacts either with its companion jaw $e$ or an object placed therebetween, when the spring $k$ will give to allow the part $b$ to finish its stroke independently of the jaw $d$. The springs $k\ l$ are each formed of a single piece of wire bent centrally upon itself and having its ends passed on opposite sides of the associated ear $i\ j$ and formed with transversely-registering loops $m$ for receiving the ends of a pin $n$, carried by said ear, from which point the spring-terminals extend laterally and forwardly to form the bearing-feet $o$ for contact with the handles of the shears, as shown. The forward end of the spring $l$ is bent at an angle to its major portion, as shown at $l'$, to form wings to guide its sliding movement on the back or upper edge of the lever, while the spring $k$ is made straight at its forward end and is of suitable length for the loop at such end to normally engage the lip or hook $h'$ and limit the opening movement of the jaw $d$ relative to the part $b$ of the shears, substantially as shown in Fig. 1. This lip or hook also prevents a displacement of the spring $k$ from engagement with the lever. The springs *k* and *l* may either be of unequal tension or have contact with the lever *h* at different distances from its fulcrum, whereby in either instance to cause the leverage applied thereto by the spring *k* to be greater than that of the opposing spring *l*. After long experimenting and tests with the different forms of springs the construction of the springs shown is found to be the most practicable and durable and to materially enhance the commercial value of the tool.

*p* represents a link which is carried by the pivot of one of the ears *i j* and adapted to be swung into position to engage a lug or spur *r* on the other of said ears for the purpose of locking the parts of the shears together when in closed position, as shown by dotted lines in Fig. 2.

Having thus described my invention, what I claim as new, and desire to secure by Letters Patent, is—

1. The combination with a pair of shears and the pivot connecting them, of a pair of supplemental jaws carried by one part of the shears, one jaw being movable relative to the shear parts and having a lever end, and the other jaw being fixed to the shear part to which it is attached and having its gripping end flush with the side of such part and disposed in the plane of movement of the other jaw and its rear portion offset or stepped from the side of such part and formed with an aperture to receive one end of said pivot whereby to broaden its bearings, and yielding means carried by the shear-handles and bearing with unequal tension against opposite edges of the lever end of the movable jaw.

2. The combination with a pair of shears and their pivot, of a gripping-jaw carried by said pivot and having a rearwardly-extending part, a companion gripping-jaw fixed to the side of the shear part contiguous to the other jaw and having a part offset and forming a bearing for the pivot at the side of the jaw carried thereby, and springs carried by the shear-handles and coacting with opposite sides of the said extended jaw part whereby to cause unequal leverage to be applied to the connected jaw in opposite directions, substantially as described.

3. The combination with a pair of shears and their pivot, of supplemental gripping-jaws carried by said pivot, one jaw being movable relative to both shear parts and having a rearward extension and the other jaw being fixed to the side of the contiguous shear part and having a portion disposed in position to coact with the movable jaw and a portion disposed at the side of said movable jaw to normally maintain it in one position relative to the shear part farthest therefrom, a spring coacting with the extension of the movable jaw to normally maintain it in one position relative to the shear part farthest therefrom, and a spring coacting with the opposite side of the extension for imparting a less leverage thereto than that imparted by the first spring.

4. The combination with a pair of shears, of a gripping-jaw pivoted thereto and having a rearward extension formed at its rear end with a hook, a part coacting with said jaw to grip an object, and springs for applying unequal leverage to opposite sides of said rearward extension, one of said springs being positioned to normally engage said hook whereby to limit the movement of the jaw in one direction relative to the shears.

5. The combination with a pair of shears, of a gripping-jaw pivoted thereto and having a rearward extension formed with an angled part, a part coacting with the jaw to grip an object, and spring members secured to the shear-handles and having their free ends riding on opposite sides of the jaw extension and tensioned to normally retain the jaw in one position relative to the handles, one of said springs having its free end positioned to normally coact with the angled part of the extension whereby to limit the opening movement of the jaw.

6. The combination with a pair of shears and the movable gripping-finger carried thereby of the tension-springs for controlling the movement of said finger, said springs each being formed of a single piece of wire bent centrally upon itself with its ends formed with transversely alining bearing-loops and terminating in feet projecting forwardly from the loops and at an angle to the major portion of the spring.

7. The combination with a pair of shears, and the movable gripping-finger carried thereby, of an ear projecting inwardly from each shear-handle and having transverse pivots projecting oppositely therefrom, and springs extending from opposite sides of the finger to said ears, said springs each being formed of a single piece of material bent centrally upon itself with its looped end in sliding contact with the finger and its end terminals passed on opposite sides of the associated ear and looped around the pivots thereon, thence extending forwardly to form feet for bearing against the contiguous shear-handle.

8. The combination with a pair of shears, of a gripping-jaw pivoted to one member thereof and having a rearward extension formed with a hook, spring members carried by the shear-handle and coacting with said rearward extension whereby to apply unequal tension to opposite sides thereof, one of said spring members having its free end in sliding contact with said extension and formed with a loop for contact with the hook on said extension to limit the movement of the jaw relative to one of the shear parts.

9. The combination with a pair of shears, of a gripping-jaw pivoted thereto and having a rearward extension formed at its end with a hook, springs secured to the shear-handles and adapted to impart unequal leverage tension to said extension, said springs each being formed with looped ends in sliding contact with said extension and the loop of one spring having engagement with the extension-hook to normally maintain the gripping-jaw in one position relative to the handle carrying such hook-engaging spring.

In testimony whereof I have hereunto signed my name in the presence of two subscribing witnesses.

VANRENSELAER W. KELLY.

Witnesses:
  CORNELL SCHREIBER,
  C. W. OWEN.